United States Patent [19]

Seltmann et al.

[11] Patent Number: 5,441,771
[45] Date of Patent: Aug. 15, 1995

[54] ANTI-FRICTION PAINT FOR ELASTOMERIC PARTS

[75] Inventors: Hans-Guenter Seltmann, Duesseldorf; Hartmut Lippert, Monheim, both of Germany

[73] Assignee: Henkel Kommanditgesellschaft auf Aktien, Duesseldorf, Germany

[21] Appl. No.: 338,289

[22] Filed: Nov. 10, 1994

Related U.S. Application Data

[63] Continuation of Ser. No. 689,263, filed as PCT/EP89/01398, Nov. 18, 1989, abandoned.

[30] Foreign Application Priority Data

Nov. 26, 1988 [DE] Germany .................. 38 39 937.7

[51] Int. Cl.⁶ .................. B05D 3/02; B32B 7/00
[52] U.S. Cl. .................. 427/386; 528/44;
528/55; 528/70; 528/76; 528/80; 528/85;
525/452; 525/453; 525/460; 427/207.1;
427/256; 427/385.5; 427/387; 428/423.1;
428/424.2
[58] Field of Search ............. 528/44, 55, 70, 76,
528/80, 85; 525/452, 453, 460; 427/207.1, 256,
385.5, 386, 387, 393.7; 428/423.1, 424.2

[56] References Cited

U.S. PATENT DOCUMENTS

| 4,098,742 | 7/1978 | Mueller | 524/588 |
| 4,569,961 | 2/1986 | Oezelli et al. | 524/186 |
| 4,572,871 | 2/1986 | Mabuchi et al. | 428/423 |
| 4,572,872 | 2/1986 | Yamazaki et al. | 428/423 |

FOREIGN PATENT DOCUMENTS

| 151713 | 8/1985 | European Pat. Off. . |
| 217364 | 4/1987 | European Pat. Off. . |
| 0293084 | 5/1987 | European Pat. Off. . |
| 0251334 | 1/1988 | European Pat. Off. . |
| 3335150 | 7/1984 | Germany . |
| 3400852 | 7/1985 | Germany . |

OTHER PUBLICATIONS

G. Klement in Kautschuk und Gummi, Kunstoffe, vol. 23 (1970), No. 8, pp. 375–378.

*Primary Examiner*—Samuel A. Acquah
*Attorney, Agent, or Firm*—Ernest G. Szoke; Wayne C. Jaeschke; Real J. Grandmaison

[57] ABSTRACT

Moisture-hardening one-component polyurethane paints for coating elastomeric parts, consisting of polyfunctional isocyanate compounds, solvents and, optionally, auxiliaries and/or coupling agents, which contain reactive polysiloxanes and reactive surfactants for improving surface slip, may be applied by a simple painting process to elastomers, particularly apolar elastomers, for example based on styrene-butadiene rubber or polyethylene-propylene-diene and, after drying, have an optically smooth surface with good surface-slip properties with respect to glass and no abrasive effect.

21 Claims, No Drawings

ANTI-FRICTION PAINT FOR ELASTOMERIC PARTS

This application is a continuation of application Ser. No. 07/689,263 filed as PCT/EP89/01398, Nov. 18, 1989, now abandoned.

This invention relates to a polyurethane paint for elastomers containing slip-improving additives and to a process for its production.

Elastomers showing improved surface slip in addition to their other well-known favorable properties are required for a number of industrial applications, for example for the sealing of window wells for moving glass parts in automobiles. To obtain such improved surface slip, it has hitherto been possible to coat the elastomeric part with a paint containing firmly fixed spacers of hard materials. Particles of glass, aluminium, polypropylene or PVC are used as the spacers. One such process is described, for example, in DE 33 35 150.

A fundamental disadvantage lies in the fact that the peak-and-trough structure of the spacer-containing paint prevents optimal sealing, so that unwanted drafts can enter and unwanted noise can be caused. Another disadvantage is that the surface of the elastomeric parts thus painted is not an optically smooth, glossy surface, but instead looks like fine emery cloth.

In another process which is described in U.S. Pat. No. 4,572,872 and U.S. Pat. No. 4,572,871, silicones and fluoroplastics are added to the anti-friction paint. Paints such as these have the disadvantage that, under extreme weather conditions, such as heat, cold, wind and rain, to which the elastomeric part is normally exposed, they gradually lose the silicones and fluoropolymers added, which leads to a reduction in the surface slip of the elastomeric part with respect to glass and is undesirable. Another disadvantage is that the silicones are oils which are known to act as release agents.

On account of their characteristic properties, release agents such as these are carried over relatively easily and can lead to difficulties, for example at the assembly stage during the bonding and the painting of bodywork parts. Accordingly, the use of unfixed silicone oils is regarded as undesirable by automobile manufacturers.

As described in hitherto unpublished EP application 293 084, silicone oils can be fixed by using reactive polysiloxanes which react in substantially irreversibly. However, the surface slip properties of such paints are still in need of improvement.

One-component polyurethane paints have been known to the elastomer expert for years, cf. for example G. Klement in Kautschuk und Gummi, Kunstoffe, Vol. 23 (1970), No. 8, pages 375–378.

Accordingly, the problem addressed by the invention is to provide a paint for elastomeric parts which shows improved surface slip properties with respect to glass, is applied by a simple painting process, is not abrasive to glass, has an optically smooth surface, forms a windproof and waterproof seal with the glass, can be pigmented and is durable.

This problem was solved by a moisture-hardening one-component polyurethane paint for the coating of elastomers, consisting of polyfunctional isocyanate compounds, solvents and, if desired, auxiliaries and/or coupling agents, characterized in that reactive polysiloxanes and reactive surfactants are present for improving surface slip.

The moisture-hardening one-component polyurethane paints according to the invention contain polyurethane prepolymers containing on average two or more isocyanate groups per molecule as binder. The polyurethane prepolymers are produced by mixing of alcohols having a functionality of 2 and higher with an excess of isocyanate compounds having a functionality of 2 and higher. The viscosity of the products may be influenced through the choice of the quantities used. In the production of such polyurethane prepolymers for paints, the expert will select the ratio in such a way as to establish a viscosity which enables paints containing 30 to 40% by weight polyurethane prepolymer to be applied by spraying. A favorable OH to NCO ratio is from 1:1.3 to 1:1.8.

Diisocyanates are particularly suitable for the production of the polyurethane prepolymers. Mononuclear and polynuclear aromatic diisocyanates, cyclic aliphatic or linear aliphatic diisocyanates may be used. Examples of such diisocyanates are diphenylmethane diisocyanate, the isomeric tolylene diisocyanates, isophorone diisocyanate, dicyclohexyl methane diisocyanate, tetramethylene diisocyanate or hexamethylene diisocyanate.

The polyfunctional hydroxyl component may be a difunctional alcohol such as, for example, ethylene glycol, propylene glycol, neopentyl glycol, butane-1,4-diol, hexane-1,6-diol; a triol, such as glycerol, trimethylol propane or trimethylol ethane; or a hydroxy compound of relatively high functionality, such as pentaerythritol. Particularly suitable difunctional alcohols are the condensation products of the above-mentioned compounds. For example, polypropylene glycol having an average molecular weight of from about 100 to 10,000 and preferably from 800 to 2,500 is a suitable diol. Other suitable diols are polyethylene glycols in the same molecular weight range. In addition to the polyols mentioned, many other suitable polyols, including for example oleochemical polyols or castor oil, are known to the expert on polyurethane paints.

The polyurethane paints according to the invention also contain solvents which, above all, promote their application. Suitable solvents are organic solvents which do not react with free isocyanate groups, i.e. hydrocarbons, ketones, esters, ethers and/or chlorinated hydrocarbons. Particularly suitable solvents are, for example, xylene, toluene, methyl isobutyl ketone and methoxypropyl acetate.

The paints according to the invention contain reactive polysiloxanes and reactive surfactants to improve their surface-slip properties. Suitable reactive polysiloxanes are already known and include polysiloxanes which contain at least one group in the chain or side chain which is reactive to isocyanate-terminated paint constituents and/or to the compounds formed therefrom as a result of the moisture hardening process, essentially epoxy-modified polysiloxanes, polyhydrogen alkyl siloxanes and/or silanol-modified polysiloxanes. Epoxy-modified siloxanes are understood by the expert to be chemically reactive silicone oils containing modifying epoxy alkyl side groups.

In addition, the paints according to the invention may contain polymethyl hydrogen siloxane and also polymethyl hydrogen siloxane as the reactive polysiloxane.

Silanol-modified siloxanes may also be used as the reactive polysiloxanes. They are polyalkyl siloxane polymers containing terminal silanol groups. These silanol oils may be regarded as reactive analogs of the usual silicone oils.

In addition to the reactive siloxanes, the paints according to the invention also contain reactive surfactants, preferably fluorinated surfactants and, more preferably, fluorinated nonionic surfactants for improving their surface-slip properties. According to the invention, the surfactant contains at least one functional group, preferably a hydroxyl group, which is reactive to isocyanate-terminated paint constituents and/or to the compounds formed therefrom as a result of the moisture hardening process.

According to the invention suitable surfactants may contain a hydrophobic $C_{8-24}$ alkyl radical or a perfluorinated $C_{4-18}$ and preferably $C_{8-12}$ alkyl radical and, in either case, contain a non-fluorinated hydrophilic group. Preferred hydrophilic groups are oligomers of ethylene oxide, particularly those in which a reactive group is preferably borne by the carbon atom which is situated furthest from the alkyl radical in the molecule and which is therefore terminal.

According to the invention, suitable surfactants containing only one, more especially terminal, reactive group are preferred because this ensures that these surfactants react with the NCO-terminated paint constituents in such a way that they form the end of a polymeric molecule. This has a particularly favorable effect on the surface-slip properties of the paint. In another preferred embodiment, the reactive polysiloxanes also contain only one reactive, more especially terminal, group so that, on completion of the reaction, these polysiloxanes each terminate a macromolecule of the paint.

Among the surfactants described above, those in which the alkyl radical is perfluorinated are preferred. A preferred embodiment uses nonionic fluorinated surfactants containing an isocyanate-reactive group, preferably a hydroxyl or amino group, and a non-fluorinated hydrophilic group based on the oligomer of ethylene oxide containing on average 2 to 50 ethylene oxide units per molecule, if desired at least partly replaceable by propylene oxide units, for example fluorinated alkyl polyoxyethylene ethanol.

The reactive surfactants according to the invention are used in a quantity of from about 0.05 to 5% by weight. In order not to impair the other favorable properties of the paint, the expert will use no more than 5% by weight. Where quantities of less than 0.05% by weight are used, the surface-slip properties begin gradually to deteriorate. Accordingly, a preferred range is from 0.05% by weight to 5% by weight and more especially from 0.1% by weight to 2% by weight. The reactive polysiloxanes are preferably added to the paint in a quantity of from 0.1 to 10% by weight. In order not to affect the character of the paint and its other favorable properties, the expert will use no more than 10% by weight reactive polysiloxanes. Where quantities of less than 0.1% by weight are used, the surface-slip properties become increasingly poorer. Accordingly, a preferred range is from 0.1 to 10% by weight and more especially from 0.5 to 3% by weight.

The reactive surfactants and the reactive polysiloxanes are fixed firmly and largely irreversibly in the paint so that, even after a relatively long time and the effects of subsequent weathering, there is at least no significant depletion of these substances from the paint.

The paints according to the invention may contain polyfunctional aromatic nitroso compounds to improve their adhesion and their water resistance. Compounds such as these are already known and their use as coupling agents for elastomeric paints is described, for example, in DE 34 00 852.

Dinitroso compounds in which the nitroso groups are situated at non-adjacent carbon atoms are particularly suitable for the purposes of the invention. Dinitroso compounds of mononuclear and polynuclear aromatics are suitable, particular preference being attributed to the dinitroso compounds of substituted or unsubstituted mononuclear aromatics, including for example m-dinitrosobenzene, p-dinitrosobenzene, m-dinitroso naphthalene, p-dinitrosonaphthalene, 2,5-dinitroso-p-cumene, 2-methyl-1,4-dinitrosobenzene, 2-methyl-5-chloro-1,4-dinitrosobenzene, 2-fluoro-1,4-dinitrosobenzene, 2-methoxy-1,3-dinitrosobenzene, 5-chloro-1,3-dinitrosobenzene, 2-benzyl-1,4-dinitrosobenzene and 2-cyclohexyl-1,4-dinitrosobenzene.

Among the compounds mentioned, 1,4-dinitrosobenzene is preferred. It is possible to use both the pure chemical substance and also preparations containing 1,4-dinitrosobenzene, including for example suspensions of the substance in solvents having an active substance content of 30 to 40%. Suspensions such as these are commercially available.

In addition, the paints according to the invention may contain further auxiliaries, including for example retarders, accelerators, stabilizers and pigments. These auxiliaries are known to the expert and are described in the literature on polyurethane paints.

The paints according to the invention may be produced from a commercially available polyurethane paint suitable for elastomers to which the reactive polysiloxanes and/or reactive surfactants may be added with stirring. The paints according to the invention may be processed, i.e. applied to elastomeric parts, for example based on ethylene-propylene-diene (EPDM) or styrene-butadienerubber, and to other flexible substrates, for example polyurethane, by standard methods, for example by spray coating, spread coating or knife coating.

EXAMPLES

In all the following Examples, a spray gun, for example a Walter-Pilot-III with a 1.0 or 1.5 mmnozzle, was used to apply the paint according to the invention to elastomeric parts based on ethylene-propylene-diene (EPDM) or styrene-butadiene rubber (spraying pressure 3 bar). The elastomeric parts had been produced from standard rubber mixtures known to the expert by known vulcanization techniques. The paint was dried for 5 minutes at 160° C. The following standard formulation was used in all the Examples:

| | |
|---|---|
| 40.1 parts by weight | polypropylene glycol, molecular weight 1025, OH value 109.6 |
| 238.0 parts by weight | polypropylene glycol, molecular weight 2025, OH value 55.4 |
| 21.1 parts by weight | trimethylol propane |
| 195.8 parts by weight | diphenylmethane diisocyanate |
| 125.0 parts by weight | xylene |
| 125.0 parts by weight | toluene |
| 220.0 parts by weight | methyl isobutyl ketone (MIBK) |
| 35.0 parts by weight | methoxy propyl acetate (MPAc) |
| 1000.0 parts by weight | |

The propylene glycols, the solvents, the trimethylol propane and the diisocyanate were weighed into a reactor, heated to 90° C. and stirred at that temperature for 3.5 hours. The contents of the reactor were then drained off through filters at 50° C. 1% by weight 1,4-dinitrosobenzene and 1% by weight carbon black (Spezialschwarz 4) were then added. The paint was passed through a bead mill.

The other constituents mentioned below in the Examples were added to the lacquer in a high-speed stirrer.

The friction coefficients mentioned in the following Examples were determined as follows on a sloping plane of glass:

A weight of 650 g is applied at room temperature to the painted rubber plate (18 cm×9 cm) which is then placed on a glass plate cleaned with isopropanol arranged as a sloping plane. The smallest possible angle $\alpha$ formed between the sliding surface and the horizontal, at which the rubber plate slides on its own, i.e. after overcoming the static friction, is determined. The friction coefficient is defined as tan $\alpha$.

The friction coefficient was determined
1. after drying of the paint,
2. after storage in water, i.e. the coated elastomeric part was stored for 3 days in water at 80° C.,
3. after ageing, i.e. the coated elastomeric part was stored for 24 hours at 80° C. in a circulating air drying cabinet.

Example 1

1% by weight epoxy-modified polysiloxane and 0.2% by weight fluorinated alkyl polyoxyethylene ethanol were added to the standard formulation mentioned above and an elastomeric part was coated as described with this paint according to the invention. The friction coefficient was 0.25 after hardening, 0.30 after storage in water and also 0.30 after ageing.

Example 2

0.5% by weight epoxy-modified polysiloxane and 0.3% by weight fluorinated surfactant were added to the standard formulation mentioned above and an elastomeric part was coated as described with this paint according to the invention. The friction coefficient was 0.30 after hardening, 0.40 after storage in water and 0.35 after ageing.

Example 3

2% by weight epoxy-modified polysiloxane and 0.1% by weight fluorine surfactant were added to the standard formulation mentioned above and an elastomeric part was coated as described with this paint according to the invention. The friction coefficient was 0.25 after hardening, 0.30 after storage in water and also 0.30 after ageing.

Example 4

3% by weight polyhydrogen methyl siloxane and 0.2% by weight fluorinated surfactant were added to the standard formulation mentioned above and an elastomeric part was coated as described with this paint according to the invention. The friction coefficient was 0.25 after hardening, 0.30 after storage in water and also 0.30 after ageing.

The following systems, which do not correspond to the invention, were tested for comparison by the same process as described above with the following results:

Comparison Example 1

An unpainted elastomeric part had a friction coefficient of 1.5.

Comparison Example 2

An elastomeric part coated by the flocking process has the following friction coefficients: 0.25 after hardening, 0.25 after storage in water and 0.27 after ageing.

Comparison Example 3

An elastomeric part coated with the standard paint prepared as described above has the following friction coefficients: 0.70 after hardening, 0.70 after storage in water and 0.80 after ageing.

Comparison Example 4

An elastomeric part coated with a commercially available lacquer containing spacers has the following friction coefficients: 0.30 after hardening, 0.30 after storage in water and 0.45 after ageing.

Comparison Example 5

8% by weight polytetrafluoroethylene was added to the standard formulation mentioned above and an elastomeric part was coated as described with this paint. The friction coefficient was 0.35 after hardening, 0.35 after storage in water and 0.35 after ageing. After 100 sliding cycles over glass, the friction coefficient increased to 0.5 because the polytetrafluoroethylene had been rubbed away.

Comparison Example 6

1% Epoxy-modified polysiloxane was added to the standard formulation mentioned above and an elastomeric part was coated as described with this paint. The friction coefficient was 0.40 after hardening, 0.40 after storage in water and 0.50 after ageing.

We claim:

1. A moisture-hardening single-component polyurethane paint for the coating of an elastomer consisting essentially of a polyurethane prepolymer containing on average two or more isocyanate groups per molecule produced by mixing an alcohol having a functionality of at least 2 with an excess of isocyanate compound having a functionality of at least 2, a solvent, from about 0.1 to about 10% by weight of a reactive polysiloxane consisting essentially of a modified siloxane containing one or more functional groups which are reactive with isocyanate-terminated paint constituents or with the compounds formed therefrom, and from about 0.05 to about 5% by weight of a reactive surfactant, based on the weight of said paint, said reactive surfactant consisting essentially of a modified surfactant containing one or more functional groups which are are active with isocyanate-terminated paint constituents or with the compound formed therefrom, whereby said paint has improved surface-slip properties with respect to glass.

2. A polyurethane paint as in claim 1 wherein said reactive surfactant consists of a fluorinated surfactant.

3. A polyurethane paint as in claim 1 wherein said reactive surfactant contains a hydrophobic $C_{8-24}$ alkyl radical or a perfluorinated $C_{4-18}$ alkyl radical, and a non-fluorinated hydrophilic group which is reactive to isocyanate—terminated paint components.

4. A polyurethane paint as in claim 1 wherein said reactive surfactant consists of a nonionic fluorinated surfactant containing an isocyanate-reactive group and a non-fluorinated hydrophilic group consisting of an oligomer of ethylene oxide containing on average 2 to 50 ethylene oxide units per molecule.

5. A polyurethane paint as in claim 4 wherein said isocyanate-reactive group is selected from a hydroxyl and amino group.

6. A polyurethane paint as in claim 4 wherein said ethylene oxide units are partially replaced by propylene oxide units.

7. A polyurethane paint as in claim 1 wherein said reactive polysiloxane is selected from an epoxy-modified polysiloxane, a polyhydrogen alkyl siloxane, and a silanol-modified polysiloxane.

8. A polyurethane paint as in claim 1 wherein said polyurethane prepolymer is based on an aliphatic or aromatic diisocyanate and an aliphatic difunctional or trifunctional alcohol or ether alcohol.

9. A polyurethane paint as in claim 1 containing a coupling agent comprising a dinitroso compound of a mononuclear or polynuclear aromatic containing at least two nitroso groups on non-adjacent carbon atoms.

10. A polyurethane paint as in claim 1 including a pigment, accelerator and a substance for preventing bubble formation.

11. The process of improving the surface slip properties of an elastomer comprising applying to said elastomer a moisture-hardening, single-component polyurethane paint consisting essentially of a polyurethane prepolymer containing on average two or more isocyanate groups per molecule produced by mixing an alcohol having a functionality of at least two with an excess of isocyanate compound having a functionality of at least 2, a solvent, from about 0.1 to about 10% by weight of a reactive polysiloxane consisting essentially of a modified siloxane containing one or more functional groups which are reactive with isocyanate-terminated paint constituents or with the compounds formed therefrom, and from about 0.05 to about 5% by weight of a reactive surfactant, based on the weight of said paint, said reactive surfactant consisting essentially of a modified surfactant containing one or more functional groups which are reactive with isocyanate-terminated paint constituents or with the compounds formed therefrom.

12. The process as in claim 11 wherein said reactive surfactant consists of a fluorinated surfactant.

13. The process as in claim 11 wherein said reactive surfactant contains a hydrophobic $C_{8-24}$ alkyl radical or a perfluorinated $C_{4-18}$ alkyl radical, and a non-fluorinated hydrophilic group which is reactive to isocyanate-terminated paint components.

14. The process as in claim 11 wherein said reactive surfactant consists of a nonionic fluorinated surfactant containing an isocyanate-reactive group and a non-fluorinated hydrophilic group consisting of an oligomer of ethylene oxide containing on average 2 to 50 ethylene oxide units per molecule.

15. The process as in claim 14 wherein said isocyanate-reactive group is selected from a hydroxyl and amino group.

16. The process as in claim 14 wherein said ethylene oxide units are partially replaced by propylene oxide units.

17. The process as in claim 11 wherein said reactive polysiloxane is selected from an epoxy-modified polysiloxane, a polyhydrogen alkyl siloxane, and a silanol-modified polysiloxane.

18. The process as in claim 11 wherein said polyurethane prepolymer is based on an aliphatic or aromatic diisocyanate and an aliphatic difunctional or trifunctional alcohol or ether alcohol.

19. The process as in claim 11 wherein said paint contains a coupling agent comprising a dinitroso compound of a mononuclear or polynuclear aromatic containing at least two nitroso groups on non-adjacent carbon atoms.

20. The process as in claim 11 wherein said paint contains a pigment, accelerator and a substance for preventing bubble formation.

21. The process as in claim 11 wherein said elastomer is selected from styrene-butadiene, polyethylene-propylene-diene, and polyurethane.

* * * * *